Dec. 31, 1935.  J. H. FRIEDMAN  2,025,855
POINTER MECHANISM
Filed Feb. 15, 1935
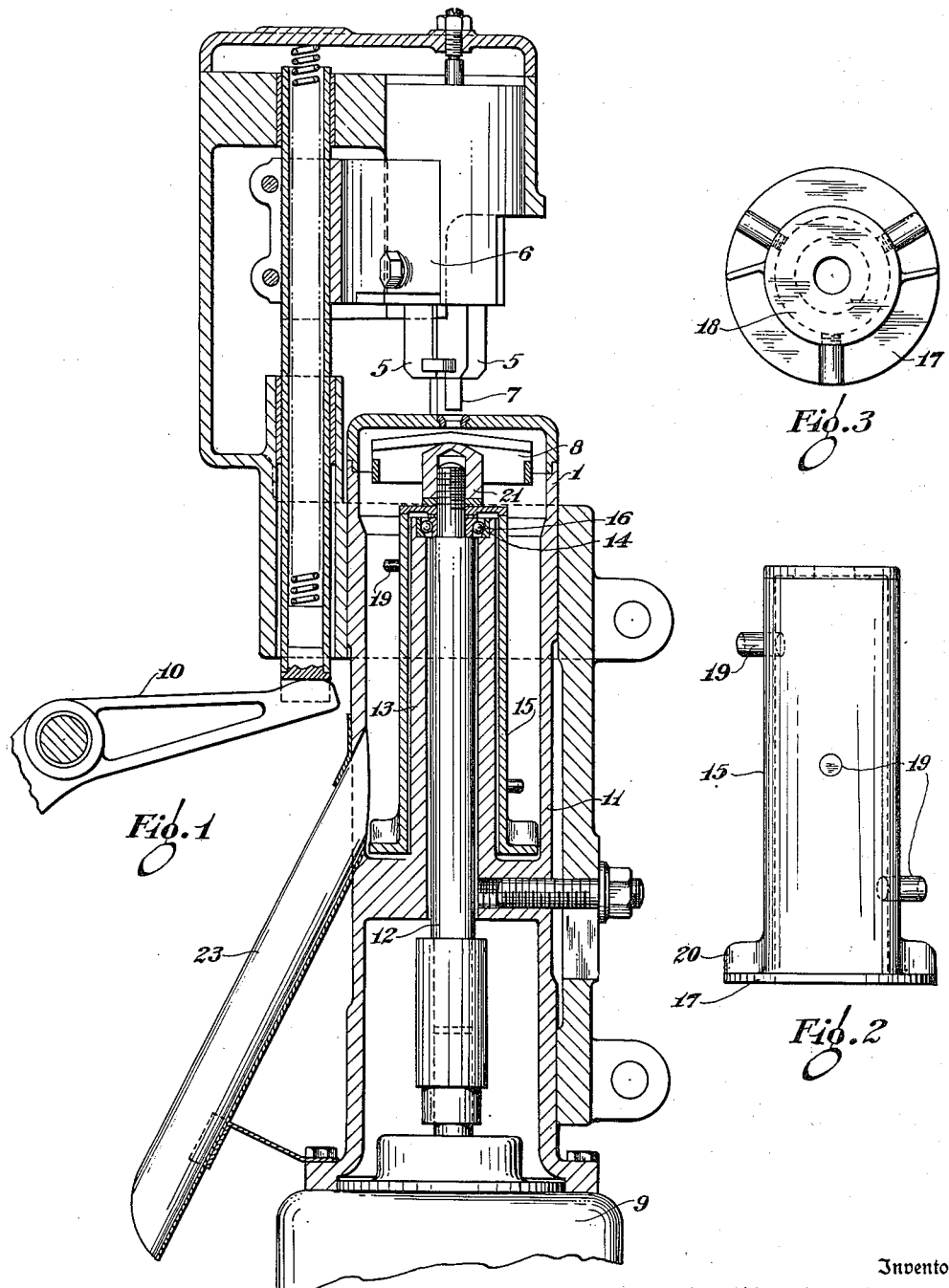
Inventor
JOHN H. FRIEDMAN
By Richey & Watts
Attorney Patented Dec. 31, 1935

2,025,855

UNITED STATES PATENT OFFICE 2,025,855

POINTER MECHANISM

John H. Friedman, Tiffin, Ohio, assignor to The National Machinery Company, Tiffin, Ohio, a corporation of Ohio Application February 15, 1935, Serial No. 6,709

15 Claims. (Cl. 10—21)

This invention relates broadly to pointing mechanism for bolts, screws and like headed articles, and more specifically to a pointing mechanism for combined machines such for example as the machine disclosed in my co-pending application Serial No. 712,220, filed February 20, 1934.

An object of the invention is to provide in a pointing mechanism improved means for effecting a removal of the chips and waste metal cut from the bolt blank during the pointing operation.

Another object of the invention is to provide in a pointing mechanism a means to break down the waste material cut from the bolt blank during the pointing operation.

Another object of the invention is to provide in a pointing mechanism an improved means to remove the chips and waste material and combine said means with the cutter so that the means and cutter may be actuated from the same source of power.

Another object of the invention is to provide in a pointing mechanism a waste material remover that will enclose and protect the bearings of the cutter shaft.

The foregoing and other objects and advantages will become apparent in view of the following description taken in conjunction with the drawing, wherein:

Figure 1 is a sectional elevation of the pointing mechanism with the waste remover in operative position;

Figure 2 is an elevation of the waste remover;

Figure 3 is a plan view of the waste remover shown in Figure 2.

Referring to the drawing in detail, the reference numeral 1 designates the pointing mechanism generally, in which a pair of jaws 5—5 carried by the chuck head 6 moves the bolt blank 7 down into engagement with a rotary cutter 8 driven by an electric motor 9. The movement of the chuck head is effected in any suitable way. For example, when the pointer is used in the machine of my aforesaid co-pending application it is controlled by a bell crank 10 which is mounted to move in timed relation with the bolt machine which fabricates the bolt blanks 7. Reference is made to said application for a full disclosure of the construction and operation of a form of chuck head, jaws and means for feeding blanks to the pointer.

In pointing mechanisms of the type shown it is important that the spiral shavings and chips cut from the blank 7 by the cutter 8 be removed from the vicinity of the cutter and to accomplish this removal I have provided the agitator or breaker 15 shown in Figure 2. A housing 11 surrounds a shaft 12 extending upwardly from the motor 9 to the cutter 8 and within this housing and integral therewith is a shaft tube 13 extending upwardly toward the cutter and terminating in a ball bearing seat 14. A ball bearing assembly or analogous anti-friction bearing assembly 16 is mounted in the seat 14 and provides a bearing for the cutter shaft 12.

The breaker or chip remover 15 comprises a cylinder proportioned to loosely surround the tube 13 provided with a flanged base portion 17 and an apertured top 18. The outer surface of the cylindrical portion of the breaker is provided with a plurality of staggered breaker members 19 and adjacent the upper surface of the base flange 17 are formed the inclined ejector blades 20.

When positioned in the pointing mechanism the waste remover 15 is arranged to surround the tube 13; the upper end of the cutter shaft 12 is extended through the aperture of the top 18 and the chip remover 15 is securely clamped to turn with the shaft 12 by the threaded cutter head 21. The above described disposition of the breaker or waste remover 15 spaces the base 17 slightly from the base of the tube 13 and adjacent a chute 23 opening out of the main casing 11 of the pointing mechanism.

In operation the breaker or waste material remover 15 rotates with the cutter 8 and as the spiral shavings drop from the cutter 8 the breaker members 19 engage the shavings and break them into small chips which drop on the base 17. The blades 20 carry the chips in a circular path and they are forcibly ejected through the chute 23 by the centrifugal force imparted by the rotating blades 20.

From the foregoing description of the operation it will be observed that the character of the waste material is changed from spiral shavings by the breakers 19 into small chips easily removed by the blades 20. This reduces the bulk of the waste material and facilitates its removal and handling. The waste remover also functions as a protector or cover for the anti-friction bearing assembly 16 and effectively prevents metallic particles from entering said bearing or dropping into the electric motor 9 therebelow. The waste remover may economically be manufactured by forming the body portion of metal tubing and attaching the parts 17 to 20 thereto or the entire remover may be cast as one piece.

Although I have described one modification of my invention in detail I have done so merely for the purpose of illustration and not with the desire to be limited thereto, since it is obvious that many variations in the modification described could be made by those skilled in the art without departing from the scope of my invention.

I claim:

1. In a pointing mechanism, a casing having an opening therein, a rotary cutter mounted in said casing, a rotary waste material remover mounted adjacent said cutter, means on said remover to break up said waste material, means on said remover to engage said broken material and impart a rotary motion thereto and centrifugally move said material through said opening.

2. In a pointing mechanism, a casing having an opening therein, a cutter mounted in said casing, a waste material remover mounted adjacent said cutter, means on said remover to break up said material, means on said remover to engage said broken material and move said material through said opening.

3. In a cutting mechanism, a rotary cutter carried by a shaft, a waste material remover moved by said shaft, means on said remover to throw said material from the vicinity of said cutter.

4. In a cutting mechanism, a rotary cutter carried by a shaft, a waste material remover rotated by said shaft, means on said remover to impart a rotary motion to said waste material to centrifugally move said material from said cutting mechanism.

5. In a cutting mechanism, a rotary cutter carried by a shaft, a waste material remover rotated by said shaft, means on said remover to break up said waste material, means on said shaft to impart a rotary motion to said broken material to move said material from said cutting mechanism.

6. In a cutting mechanism, a casing having an opening therein, a rotary cutter mounted within said casing on a shaft, a waste material remover rotated by said shaft, means on said remover to break up said waste material, means on said remover to impart a rotary motion to said broken material to centrifugally move said material through said opening.

7. In a cutting mechanism, a rotary cutter carried by a shaft, means mounted adjacent said cutter to break up waste material produced by said cutter, means mounted adjacent said last named means to conduct said broken material from said cutting mechanism.

8. In a cutting mechanism, a rotary cutter carried by a shaft, means moved by said shaft to break up waste material produced by said cutter, means mounted adjacent said last named means to remove said broken material from said cutting mechanism.

9. In a cutting mechanism, a vertically disposed casing, a rotary cutter mounted therein, means arranged below and moved by said cutter to eject waste material from said casing.

10. In a cutting mechanism, a vertically disposed casing, a rotary cutter mounted therein, a means arranged below said cutter and moved thereby to break up waste material from said cutter, means arranged below said last named means to impart a rotary motion to said broken material to centrifugally move said broken material from said casing.

11. In a pointing mechanism, a casing having a tube mounted therein, a cutter mounted on a shaft extending through said tube, a waste material remover mounted on said shaft and surrounding said tube and means to rotate said cutter and waste material remover.

12. In a pointing mechanism, a casing having an upwardly extending tube therein, a cutter carried by a shaft rotatable in said tube, means on said shaft between the cutter and the tube to overhang the upper end of said tube, means carried by said last named means to remove waste material from said casing.

13. In a pointing mechanism, a waste material remover comprising a vertically extending housing having an outwardly flanged base portion and an apertured top, a plurality of breaker members on the outer wall of said housing and a plurality of blade members mounted adjacent said flanged base portion.

14. In a pointing mechanism, a substantially cylindrical housing member having a driving means mounted at one end and a shaft extending from said driving means to a cutting tool positioned adjacent the other end, a waste material remover comprising a generally cylindrical sleeve arranged to surround said shaft and rotate therewith to impart a rotary ejecting movement to waste material resulting from the cutting action of said cutting tool.

15. In a pointing mechanism, a support housing having a driving means mounted at one end and a shaft arranged longitudinally therein, a bearing for said shaft carried by said housing and a cutting tool secured to the end of said shaft remote from said driving means, a waste remover secured to said shaft adjacent said cutting tool and arranged to encompass said bearing, an aperture formed in said housing and means carried by said waste remover to conduct chips and waste material from within said housing through said aperture.

JOHN H. FRIEDMAN.